US012607386B2

(12) United States Patent
Strange

(10) Patent No.: US 12,607,386 B2
(45) Date of Patent: Apr. 21, 2026

(54) MULTI-WELL GEOTHERMAL SYPHONING SYSTEM

(71) Applicant: GOOD WATER ENERGY LTD, Claremont (AU)

(72) Inventor: Warren Ross Strange, Claremont (AU)

(73) Assignee: GOOD WATER ENERGY LTD., Claremont (AU)

( * ) Notice: Subject to any disclaimer, the term of this patent is extended or adjusted under 35 U.S.C. 154(b) by 0 days.

(21) Appl. No.: 18/685,006

(22) PCT Filed: Aug. 9, 2022

(86) PCT No.: PCT/AU2022/050864

§ 371 (c)(1),
(2) Date: Feb. 20, 2024

(87) PCT Pub. No.: WO2023/019292

PCT Pub. Date: Feb. 23, 2023

(65) Prior Publication Data

US 2024/0369264 A1 Nov. 7, 2024

(30) Foreign Application Priority Data

Aug. 20, 2021 (AU) ................................ 2021106085
Aug. 20, 2021 (AU) ................................ 2021902611

(51) Int. Cl.
*F24T 10/40* (2018.01)
*E21B 43/30* (2006.01)
(Continued)

(52) U.S. Cl.
CPC ............ *F24T 10/40* (2018.05); *E21B 43/305* (2013.01); *F03G 4/001* (2021.08); *F03G 4/029* (2021.08);
(Continued)

(58) Field of Classification Search
CPC .......... F24T 10/15; F24T 10/40; F03G 4/001; F03G 4/029; F03G 7/04–047; E21B 43/305
See application file for complete search history.

(56) References Cited

U.S. PATENT DOCUMENTS 7,251,938 B1 8/2007 Bond
2012/0174581 A1 7/2012 Vaughan et al.
(Continued)

FOREIGN PATENT DOCUMENTS

CN 1699941 A * 11/2005 ............... F24J 3/081
CN 103017388 A * 4/2013
(Continued)

OTHER PUBLICATIONS

International Search Report for related International Application No. PCT/AU2022/050864; action dated Feb. 23, 2023; (4 pages).
(Continued)

*Primary Examiner* — Laert Dounis
(74) *Attorney, Agent, or Firm* — K&L Gates LLP

(57) ABSTRACT
The present disclosure relates to a multi-well geothermal syphoning system, comprising at least one injection well and at least one production well, the at least one injection well having an inlet valve for controlling a volume of a fluid medium entering the system and the at least one production well having an outlet valve for controlling the volume of the fluid medium exiting the system, each of the wells having a well bore extending downwardly from a ground surface to define a plurality of substantially vertical bore sections, a first well bore comprising a first vertical bore section turning through 90 degrees and extending parallel to the ground surface to thereby define a horizontal bore section, the first well bore intersecting with the vertical bore sections of each of the remaining wells to fluidly interconnect each well of the system such that the fluid medium at a first temperature is introduced into the at least one injection well and the fluid
(Continued)

medium at a second temperature is drawn from the at least one production well.

16 Claims, 6 Drawing Sheets

(51) Int. Cl.
    *F03G 4/00*         (2006.01)
    *F24T 10/00*      (2018.01)
    *F24T 10/15*      (2018.01)

(52) U.S. Cl.
    CPC ........... *F24T 10/15* (2018.05); *F24T 2010/56* (2018.05); *Y02E 10/10* (2013.01)

(56)            References Cited

U.S. PATENT DOCUMENTS

2013/0283791 A1* 10/2013 Riley ...................... F03G 4/074
                                           60/641.1
2015/0300327 A1* 10/2015 Sweatman ................ F03G 7/04
                                           60/641.2

FOREIGN PATENT DOCUMENTS

| CN | 108222831 A | * | 6/2018 |
| CN | 209042497 U | | 6/2019 |
| CN | 209054794 U | | 7/2019 |
| CN | 111520924 A | * | 8/2020 |
| CN | 211668052 U | | 10/2020 |
| CN | 114427755 A | * | 5/2022 |
| CN | 114508866 A | * | 5/2022 |
| EP | 0294809 A2 | * | 12/1988 |
| JP | 2017083136 A | | 5/2017 |

OTHER PUBLICATIONS

Written Opinion for related International Application No. PCT/AU2022/050864; action dated Feb. 23, 2023; (6 pages).

* cited by examiner

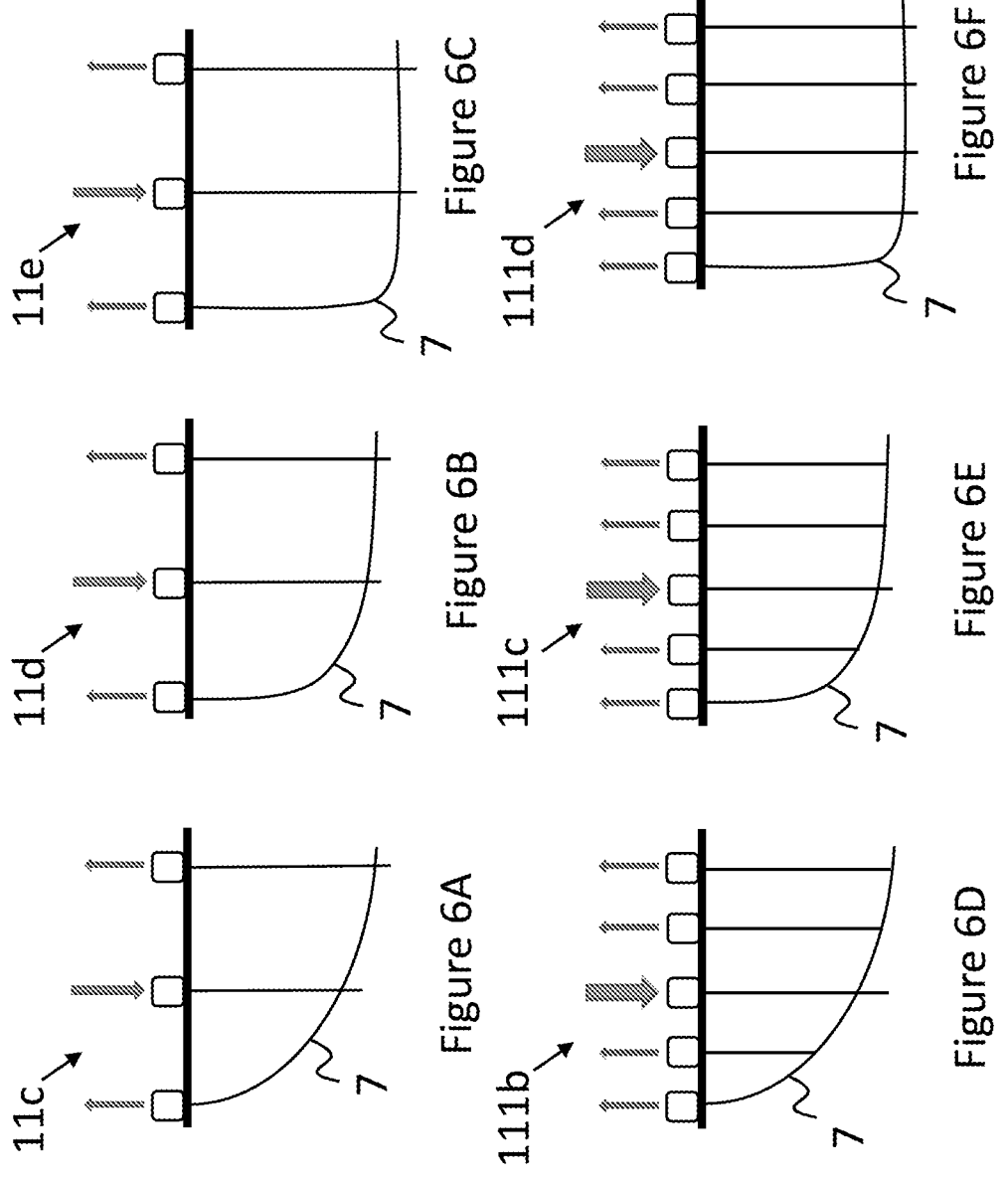

MULTI-WELL GEOTHERMAL SYPHONING SYSTEM

CROSS-REFERENCE TO RELATED APPLICATIONS

This application is the National Stage filing under 35 U.S.C. 371 of International Application No. PCT/AU2022/050864, filed on Aug. 9, 2022, which claims the benefit of earlier filing date and right of priority to Australian Application No. 2021902611 filed on Aug. 20, 2021, and Australian Application No. 2021106085 filed on Aug. 20, 2021, the contents of which are all hereby incorporated by reference herein in their entirety.

FIELD

The disclosure herein is directed to a multi-well geothermal syphoning system having a single injection well and a plurality of production wells configured to draw thermal energy from sub-surface geology into a fluid medium.

BACKGROUND

Wells are used to provide access to heated geology below the ground and can channel a fluid or alternative heat transfer medium therethrough to deliver thermal energy from the geology at the bottom of the well to the surface. The heated fluid can then be channelled to a plethora of mechanical systems to convert the thermal energy to mechanical work.

Wells can be provided with single or multiple flow channels for moving fluids into and out of subsurface reservoirs, sometimes through natural fractures in geology and sometimes through man made fractures in geology created by artificial stimulation, sometimes coaxially aligning the inlet of the well within the outlet of the well, or vice versa in narrow tubing strings. While these arrangements are useful for shallow wells having low flow rates, they are impractical for wells having higher flow rates or deep wells where pressure drops along the depth of the well caused by the narrow tubing strings are unacceptable.

A plurality of separate wells can be arranged to form a multi-well system, where heat exchange occurs as the fluid travels into and out of the individual wells; however, the productivity of the system will depend on a number of factors, including the depth of each well, the amount of insulation provided by the well casings and the duration of the fluid travel time within the well system.

The potential for geothermal power is at least an order of magnitude greater than all fossil fuels combined. However, commercially exploiting this energy source requires creating wells of sufficient depth to reach the required temperatures and controlling the flow of water around the system to efficiently harvest geothermal energy because the heat transfer coefficient of rock formations is generally low. Additional considerations in relation to thermal conductivities, heat capacities and geometries for each component of the well or well system will also influence the productivity thereof.

SUMMARY

The present disclosure relates to a multi-well geothermal syphoning system, the system includes a plurality of closed wells, comprising a plurality of production wells in fluid communication with a single injection well. A closed well is one where the fluid medium traveling into or out of the well is contained therein, and may or may not be exposed to the surrounding geology. Where the geology is unconsolidated or sedimentary in nature, casings inserted and installed into the well will protect the fluid medium from contamination, in a positive or negative manner, from collapsing geology and from minerals and salts in the surrounding geology. Where the geology is consolidated, such as granite bed rock, no casing will be installed and the fluid or alternate fluid medium will be in direct contact with the geology where contamination of salt and minerals will reduce to very low levels over time. The closed well can deliver thermal energy drawn or transferred from the hot geology at the bottom of the well and from the walls of the production wells as the fluid is forced to the surface by the thermal syphoning effect; meanwhile, the fluid or alternative heat transfer medium within the closed well remains relatively uncontaminated by the hot bedrock geology at the bottom of the well.

In a first aspect, the disclosure provides a multi-well geothermal syphoning system, comprising at least one injection well and at least one production well, the at least one injection well having an inlet valve for controlling a volume of a fluid medium entering the system and the at least one production well having an outlet valve for controlling the volume of the fluid medium exiting the system, each of the wells having a well bore extending downwardly from a ground surface to define a plurality of substantially vertical bore sections, a first well bore comprising a first vertical bore section turning through 90 degrees and extending parallel to the ground surface to thereby define a horizontal bore section, the first well bore intersecting with the vertical bore sections of each of the remaining wells to fluidly interconnect each well of the system such that the fluid medium at a first temperature is introduced into the at least one injection well and the fluid medium at a second temperature is drawn from the at least one production well.

In some embodiments the inlet valve may be an inlet flow control valve. In some embodiments the outlet valve may be an outlet flow control valve.

The horizontal bore section (or horizontal well) may be drilled first followed by the vertical bore sections spaced sufficiently apart to avoid interference with the other wells, drilled vertically so as to intersect the first well bore of the first well drilled. Alternatively, the horizontal bore section may be drilled after the vertical well bores are drilled to the desired depth whereby the horizontal bore section will be drilled with directional control systems to ensure intersection with each of the vertical well bores previously drilled.

The first well bore includes an elbow transitioning the direction of fluid medium flow through 90 degrees between the first vertical bore section and the horizontal bore section. The injection well may be located at any position within the system, including the first well defining the first well bore that transitions from vertical to horizontal, where each of the intersecting wells can be production wells.

In a preferred embodiment, the injection well may be centrally located in the system due to flow limitations. The slower the flow rate of the fluid medium in the horizontal bore section, the more heat can be farmed. The flow rate from a central well is halved as it flows in opposing horizontal directions, in contrast to a flow of fluid medium from an injection well at one end of the system, whereby the flow rate is not slowed within the horizontal bore section until the flow of fluid medium meets a vertical bore section at a junction. The fluid medium may exit the vertical bore section of the injection well at a junction with the horizontal bore section driving the fluid medium along the horizontal bore section towards vertical bore sections of each of the two production wells.

The system may be a closed system, such that the volume of fluid medium entering the at least one injection well is substantially equal to the volume of fluid medium exiting the at least one production well. The second temperature may be greater that the first temperature. In some embodiments, the first temperature may be about 60° C.-70° C. In some embodiments, the second temperature may be about 250° C.-300° C.

The volume of fluid medium entering the injection well may be about 20 kg to 120 kg/second.

In some embodiments, the system may comprise one injection well and two production wells, wherein the plurality of wells is arranged in series and the injection well is centrally located in the series. In some embodiments the system may comprise more than one injection well. In some embodiments the system may comprise equal numbers of injection and production wells. In some embodiments, the system any comprise two injection wells and only one production well.

The fluid medium exits the vertical bore section of the injection well at a junction with the horizontal bore section driving the fluid medium along the horizontal bore section towards each of the two production wells. The fluid medium may exit each production well at a flow rate of about 10 kg to 60 kg/second.

In some embodiments, the disclosure provides a unique three-well heat mining system that operates by injecting cold water as a fluid medium down one of the wells before returning the then heated fluid medium upwardly from each of the two adjacent production wells located on either side, or on one side of, the injection well.

This three-well system operates by the fluid medium gaining heat energy along its flow path, as it circulates down the injection well and up both of the outer production wells. Circulation of the fluid medium from the injection well to the production wells is sustained by taking advantage of the difference in density gradient between the cooler injected fluid medium and the returning high temperature fluid medium. This method of passive heat exchange, driven by natural circulation, is referred to as a thermosiphon or thermal-siphon, and effectively eliminates the need for mechanical pumps to sustain operation of the system.

In some embodiments the system may comprise one injection well and four production wells, the injection well centrally located of the four production wells such that the vertical bore section of the injection well intersects with the first well bore section. This five-well heat mining system is unique and operates by injecting cold water as a fluid medium down a centrally located injection well of the system to the required depth, before returning the then heated fluid medium upwardly from each of four outwardly located production wells disposed adjacently on either side of the injection well. Injection of the cooler water into the centre well of the five well system is preferable due to the maximum flow rate for any of the horizontal drilled well sections for optimum heat transfer (farming) being around 80 kg per second due to the diameter of the horizontal well sections and the heat transfer coefficient of the rock formations. The optimum upward vertical flow rate for each production well where the fluid is flowing towards the surface is between 20 kg and 40 kg per second depending on: the diameter of the vertical well sections; the depth of the wells; the geology; and the heat transfer coefficient of the rock formations.

Each well of the three-well system and the five-well system extends vertically through a permeable geological or consolidated bedrock geology layers, each well having either an inlet to introduce the fluid medium into the system or an outlet to draw heated fluid medium from the system.

In some embodiments, the fluid medium may exit each production well at a flow rate of about 10 kg to 60 kg/second.

In some embodiments, each well may further comprise either an inlet valve set or an outlet valve set to allow adjustments to be made to the volume of the fluid medium entering and exiting each well of the system. Each inlet and each outlet valve can be adjusted to vary a flow volume of the fluid medium between the injection well/s and the production well/s to thereby control a temperature of the heated fluid medium drawn from the or each production well.

In some embodiments, the fluid medium may exit the vertical bore section of the injection well at a junction with the horizontal bore section driving the fluid medium along the horizontal bore section towards each of the two production wells In some embodiments the wells of the system are spaced at 50 m intervals. In some embodiments, the wells of the system are spaced at 100 m intervals (depending on the heat transfer coefficient of rock formations).

In some embodiments the injection well has an opening diameter of 15 inches.

In some embodiments, the production well has an opening dimeter of 12 inches.

In some embodiments the fluid medium entering the system may be cooled to between 50° C.-90° C. (cannot be over 100° C. or it will be steam) by the extraction of thermal energy at the surface for the purposes of: converting thermal energy into mechanical energy; converting salt water into fresh water by distillation processes; and/or by providing heat for various industry and residential uses and processes.

The simplicity of the system removes the need for complicated valves and downhole pumping equipment required by traditional geothermal wells. Furthermore, the constant ascending flow of the heated fluid medium from deeper and hotter thermal energy sources provides the surprising effect of heating the surrounding geology closer to the surface of the production wells, effectively creating an insulating layer of heated rock around the system and removing the requirement for expensive insulated casing and maintenance or replacement of insulated casing and extending the expected life of the geothermal wells beyond 100 years (for granite geology) and 50 years (for sedimentary geology).

The centre injection well may have a 16 inch outer casing to a depth of about 2000 m-true vertical depth (TVD), and a 15 inch open hole to about 6000 m-TVD.

The two outer production wells may have a 13-⅜ inch casing to a depth of about 2000 m-TVD, with a 12 inch open hole to about 6000 m-TVD.

The injection and production wells may be connected with an 8" to 12" open-hole, horizontal well section.

The thermal energy extraction system on the surface operates by delivering the heated fluid medium under pressure from the well heads of the two or four, production wells, extracting the heat energy for power generation and mechanical energy requirements thereby reducing the temperature of the fluid medium down to a temperature of about 100° C., before a final heat (thermal energy) extraction process for the purposes of eg. salt water desalination, reduces the fluid medium to a temperature of about 60° C. before re-injecting the fluid medium down the centre well or injection well where it is conductively heated by the surrounding rock before returning to the surface again via the outer production wells.

In some embodiments, at least one of the vertical bore sections may comprise a sump for collecting and trapping particulate matter within the system. In some embodiments, each of the vertical bore sections may comprise a sump. The vertical bore sections of each well may extend downwardly from the ground surface by 5,000 metres to 12,000 metres. In some embodiments, the horizontal bore section is surrounded by geology at temperatures between 400° C.-700° C.

Some embodiments of the system may comprise redundancy, in the form of additional production wells or injections wells that may be disconnected from the system by the inlet and outlet valves on each well. In this manner, the fluid medium entering or exiting the system can be scaled up or down to match demand. Additionally, having redundant wells can allow maintenance, repair and decommissioning of the system without detrimental impact to the overall system.

A detailed simulation model was constructed of the three-well system which indicated that this conductive heat mining system can sustain geothermal power generation beyond 20 years and potentially for more than 100 years, which presents a significant advance over known heat mining systems, with the potential to present a scalable geothermal power alternative with minimal resource risk.

The three-well system, once initiated, circulates the fluid medium through the system without mechanical pumps and is driven by the natural thermosyphon effect between the injection and production wells, with the fluid medium circulation rate controlled by a flow control valve on the surface. This system thus removes the need for insulated casings and downhole equipment such as expensive and high maintenance pumps that have a limited heat rating and are normally required by traditional geothermal energy systems.

In some embodiments, the inlet of each well may be at least partially bounded (lined) by a casing. Alternatively, in some embodiments the wells may be constructed without casings to increase thermal conductivity with the surrounding geology. An inlet channel of each well may be at least partially bounded by a geological wall of the well.

The inlet channel of the injection well and outlet channels of each production well may be supported at the surface of each respective well. The inlet channel of each well may comprise a plurality of concentric nested casings, each subsequent casing extending further into the respective well.

The outlet of each production well may comprise a desalination cleaning system, filters or screens that filter and desalinate a portion of the flow of fluid medium exiting the system to remove any particulates drawn into the fluid medium from contact with the geology forming walls of the well before the heated fluid medium is drawn from the system and directed to any downstream processes.

In some embodiments, the system may comprise between three, five or seven wells, the wells arranged in series, the injection well centrally located in the series.

The heated fluid medium communicated between the injection well and the production wells is substantially equally divided therebetween, wherein the outlet valves on each of the production wells, can be adjusted to force more or less fluid medium to flow to a selected production well head. By reducing the output of a single production well, the reduction in flow rate will be evenly distributed to the remaining production wells. Further adjustment to the outlet valves of further production wells can be made to drive the heated fluid medium towards or away from selected production wells thereby tailoring the output temperature of the heated fluid medium.

In some embodiments, the injection well inlet mass flow rate may be about four times greater than each production well outlet mass flow rate. The inlet valve may be an inlet flow control valve. The outlet valve may be an outlet flow control valve.

In some embodiments of the system, the fluid medium may be water. In some embodiments of the system, the fluid medium may be distilled water. In some embodiments of the system, the fluid medium may be compressed air, carbon dioxide ($CO_2$), various gases, petroleum, or oils produced from minerals or from bio processes.

Various features, aspects, and advantages of the disclosure will become more apparent from the following description of embodiments of the disclosure, along with the accompanying drawings.

BRIEF DESCRIPTION OF THE DRAWINGS

Exemplary embodiments of the disclosure are described below by way of example only, and not by way of limitation. Referring now to the accompanying drawings in which like numerals indicate like elements throughout the several figures:

FIGS. 6A-6F are schematic illustrations of configurations of multi-well geothermal syphoning systems in accordance with embodiments of the disclosure: FIGS. 6A-6C illustrating three-well systems and FIGS. 6D-6F illustrating five-well systems.

Embodiments will now be described more fully hereinafter with reference to the accompanying drawings, in which various embodiments, although not the only possible embodiments, of the disclosure are shown. The disclosure may be embodied in many different forms and should not be construed as being limited to the embodiments described below.

DETAILED DESCRIPTION

The disclosure will now be described in relation to specific examples, having a single injection well and a plurality of production wells. However, it is contemplated that in some embodiments the disclosure can provide more than one injection well to feed at least one production well.

In the following description, the injection well is described to be centrally located in the system relating to an efficient working model of the disclosure. However, it is also contemplated that the one or more injection wells can be located at any position within the system within the scope of the disclosure as described. It is also contemplated that the injection well can be the first well in the system having a bore that turns through 90 degrees.

Figure 1:
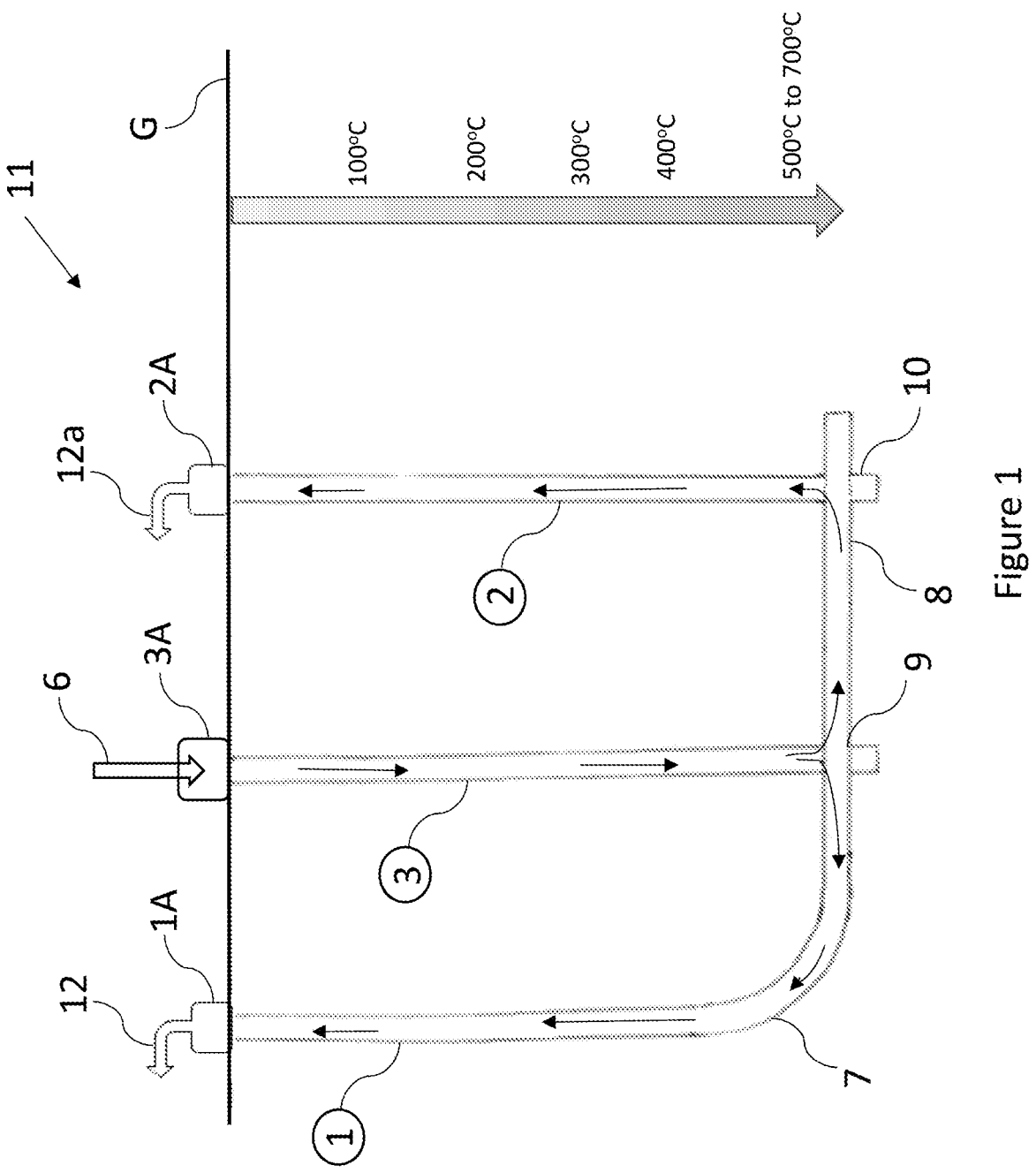
FIG. 1 is a schematic view of a multi-well geothermal syphoning system according to a first aspect of the disclosure, comprising one central injection well and two production wells.

Referring to the FIG. 1, a multi-well geothermal syphoning system (11) is described, comprising at least one injection well (3) and at least one production well (1, 2), the at least one injection well (3) having an inlet valve for controlling a volume of a fluid medium entering the system (11) and the at least one production well (1, 2) having an outlet valve for controlling the volume of the fluid medium exiting the system (11), each of the wells (1, 2, 3) having a well bore extending downwardly from a ground surface (G) to thereby define a plurality of substantially vertical bore sections, a first well bore comprising a first vertical bore section turning through 90 degrees and extending parallel to the ground surface to thereby define a horizontal bore section (8), the first well bore intersecting with the vertical bore sections of each of the remaining wells (2, 3) to fluidly interconnect each well (1, 2, 3) of the system (11) such that the fluid medium at a first temperature is introduced into the at least one injection well (3) and the fluid medium at a second temperature is drawn from the at least one production well (1, 2).

The injection well (3) is illustrated in FIG. 1 as the central well; however, the injection well can be placed in any position of the three well system (11).

The plurality of wells (1, 2, 3) generate movement of the fluid medium along the horizontal bore section (8) of the system (11) in fluid communication with each well of the system (11) to improve transfer of thermal energy between the surrounding geology and the fluid medium within the system (11) and control a flow of the fluid medium through the system (11). The plurality of wells (1-3) are configured in a series of adjacent wells comprising only one centrally located injection well (3) for inputting fluid medium into the system (11) and two outer production wells (1, 2) disposed on opposing sides of the central injection well (3).

Each well has a respective well head (1A, 2A, 3A) channelling the fluid medium into a system inlet (6) or out of one or more system outlets (12, 12a) of the system via the inlet valve or outlet valve/s (not shown). These valves can be configured as inlet flow control valves and outlet flow control valves (not shown). The valve can be a 12-inch ID valve. Each well head (1A, 2A, 3A) can be a simple single flow well head.

In FIG. 1, the system (11) removes the requirement for a vacuum insulated tubing (VIT casing) in each of the wells (1, 2, 3) which provides significant costs savings in installing each well. Removing the VIT casing also increases the thermal energy production from each production well (1, 2) by about 50%, and in some cases 60%, when compared to a well system using VIT casings and the absence of VIT casing extends the life of the geothermal wells significantly.

This configuration of the system (11) facilitates the drilling of the first production well (1) vertically downwards from the surface (G) the drill string being guided or steered only around the elbow (7) once the vertical well bore approaches the desired depth (and desired geological temperatures). The horizontal bore section (8) of the first production well (1) then extends substantially parallel to the surface for between 100 m to 500 m depending on the desired spacing for the wells (1, 2, 3). A number of known methods can then be used to drill the subsequent vertical bore sections of subsequent wells (2, 3) to meet and join with the horizontal bore section (8) thereby fluidly connecting each well (1, 2, 3) of the system (11).

FIGS. 1 to 5 illustrate a relatively tight 90-degree turn in the first well bore (1) transitioning between the vertical bore section and the horizontal bore section (8). However, the transition around elbow (7) can be more gradual, with the first well bore not becoming substantially horizontal until intersection with the second or third or fourth or fifth well of the system (illustrated schematically in FIGS. 6A-6E). FIGS. 6A-6C illustrate embodiments of a three-well system (11c, 11b, 11d) with differing configurations of the elbow (7). FIGS. 6D-6F illustrate embodiments of a five-well system (111b, 111c, 111d) with differing configurations of the elbow (7).

The fluid medium is introduced into the central injection well (3) at an inlet (6) via the well head (3A), the well head comprising an inlet flow control valve (not shown) to provide adjustment to the flow volume of fluid medium entering the system (11).

The fluid medium is drawn by thermal syphoning effect down the vertical channel of the injection well (3) until it reaches the junction (9) and is then drawn through the 90 degree turn and into the horizontal bore section (8) in two opposing directions towards each of the production wells (1, 2).

The direction of the flow of fluid medium into and out of the systems (11, 11a, 11b, 111, 111a) is indicated in FIGS. 1-6 by solid arrows and the direction of fluid flow within the system is indicated in FIGS. 1-5 by fine arrows.

The fast flow rate at which the total volume of fluid medium is introduced to the system via the single injection well (3) allows for minimal heat exchange on the downward journey towards the junction (9). As the flow volume of the fluid medium is split in two, the rate of flow drops by half as the fluid medium travels along the horizontal bore section (8) at the highest geological temperature. The reduced flow rate of fluid medium then turns through 90 degrees to enter the production wells (1, 2) to return to the surface (G) via the vertical channels of the production wells (1, 2) at the reduced flow rate, allowing additional time for heat transfer from the geology to the fluid medium. The "additional time" is understood to be in comparison to the increased (doubled) flow rate at which the fluid medium is injected into the injection well (3).

As described above this multi well system (11) can be formed by drilling just one directional production well (1) that turns from vertical to horizontal, preferably at deeper than 400° C. geology temperatures. In some embodiments, the production well (1) will not turn until it reaches a geology temperature of about 700° C. After turning through the elbow (7) the horizontal bore section (8) will continue for a further 100 m-300 m depending on the selected well spacing and the number of production wells in the system (11).

Each of the additional wells (2, 3) will be vertically drilled between 50 m and 150 m apart, to intersect with the horizontal bore section (8) of the first production well (1).

The vertical bore sections of each of well (2) and well (3) intersect the horizontal bore section (8) of well (1) and extend past the horizontal bore section (8). When drilling the injection well (3) and production well (2), connection to the horizontal bore section (8) is indicated by the fluid medium flowing up the vertical channels of each well (2, 3). As shown in each of FIGS. 1-5, the vertical bore sections of each of wells (2, 3, 4, 5) can extend beyond the horizontal bore section (8) forming an overrun or sump (10) for particulate matter to collect without blocking the system (11). Each vertical bore section, other than production well (1), can be formed to provide a respective sump (10).

Production is achieved by injecting fluid medium into the central injection well (3) of the three well system at a flow rate of about 40 kg to 80 kg per second, at around 50° C. to 70° C. The flow rate will be halved at the bottom of well (3) on reaching the junction (9) such that the horizontal bore section (8), to either side of the junction (9) towards wells (1, 2), will receive a flow rate of about 20 kg to 40 kg per second. The upward flow in each of well (1) and well (2) will output at about 20 kg to 40 kg per second, forced upwardly out of production well (1) and well (2) at the respective well heads (1A, 2A).

Thermal energy transfer from the geology is primarily achieved in the upward flow of each production well (1, 2), with a relatively small amount of thermal energy being transferred to the fluid medium on the downward flow in injection well (3) and from the short flow path of 50 m to 150 m in the horizontal bore section (8). A much larger amount of thermal energy transfer is achieved in the upward flow over several thousand metres in each of the production wells (1, 2) from exposure to geology without any insulated casings and with the fluid medium travelling at a lesser flow rate.

To calculate the anticipated thermal energy from the system (11), the flow volume in litres is multiplied by the change in temperature and then multiplied by a constant of 0.0043, in the following equation:

$$\text{Thermal energy} = 0.0043 \times \text{flow in liters/second} \times$$

$$\text{Delta } T \text{ (outlet temperature − inlet temperature)}$$

The thermal energy production constant is calculated by multiplying flow×temperature delta T×0.0043 if water is the fluid medium and referred to as the Thermal Energy Production.

Figure 2:
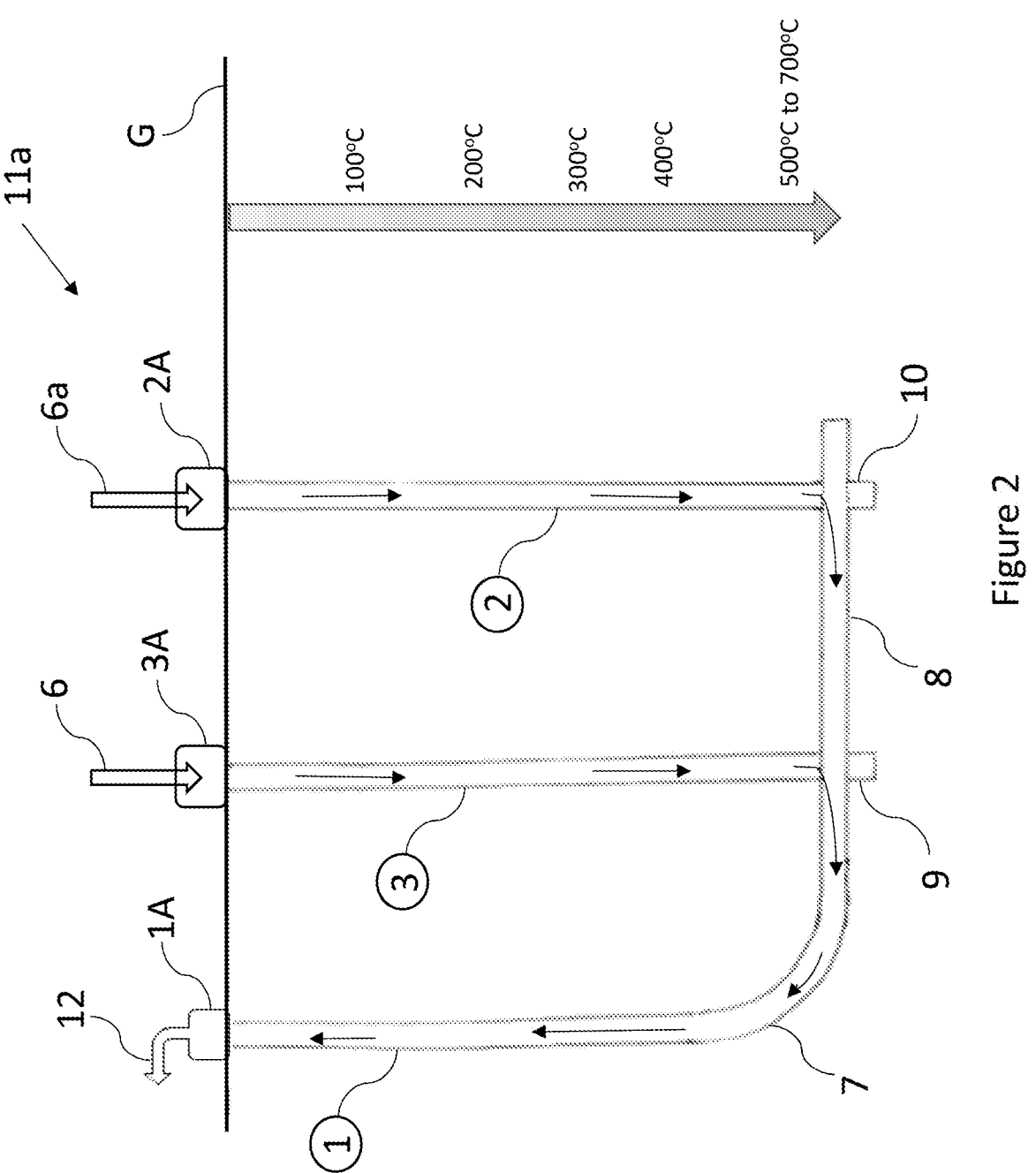
FIG. 2 is a schematic view of a multi-well geothermal syphoning system according to a second aspect of the disclosure, comprising two injection wells and one production well.

Referring to the FIG. 2, a multi-well geothermal syphoning system (11a) is illustrated according to one embodiment, comprising two injection wells (2, 3) and at least one production well (1), the two injection wells (2, 3) each having an inlet valve for controlling a volume of a fluid medium entering the system (11a) and the at least one production well (1) having an outlet valve for controlling the volume of the fluid medium exiting the system (11a), each of the wells (1, 2, 3) having a well bore extending downwardly from a ground surface (G) to define a plurality of substantially vertical bore sections, a first well bore comprising a first vertical bore section turning through 90 degrees and extending parallel to the ground surface to thereby define a horizontal bore section (8), the first well bore intersecting with the vertical bore sections of each of the remaining wells (2, 3) to fluidly interconnect each well (1, 2, 3) of the system (11a) such that the fluid medium at a first temperature is introduced into the two injection wells (2, 3) and the fluid medium at a second temperature is drawn from the at least one production well (1).

The system (11a) of FIG. 2 illustrates a first fluid inlet (6) and a second fluid inlet (6a) and at least one system fluid outlet (12).

The description and features of system (11a) are understood to operate in the same manner as described above in relation to FIG. 1, notwithstanding the higher input volumes of fluid medium into the system via the system inlets (6, 6a) and the reversal of some flow directions of the fluid medium in the plurality of vertical bore sections.

Figure 3:
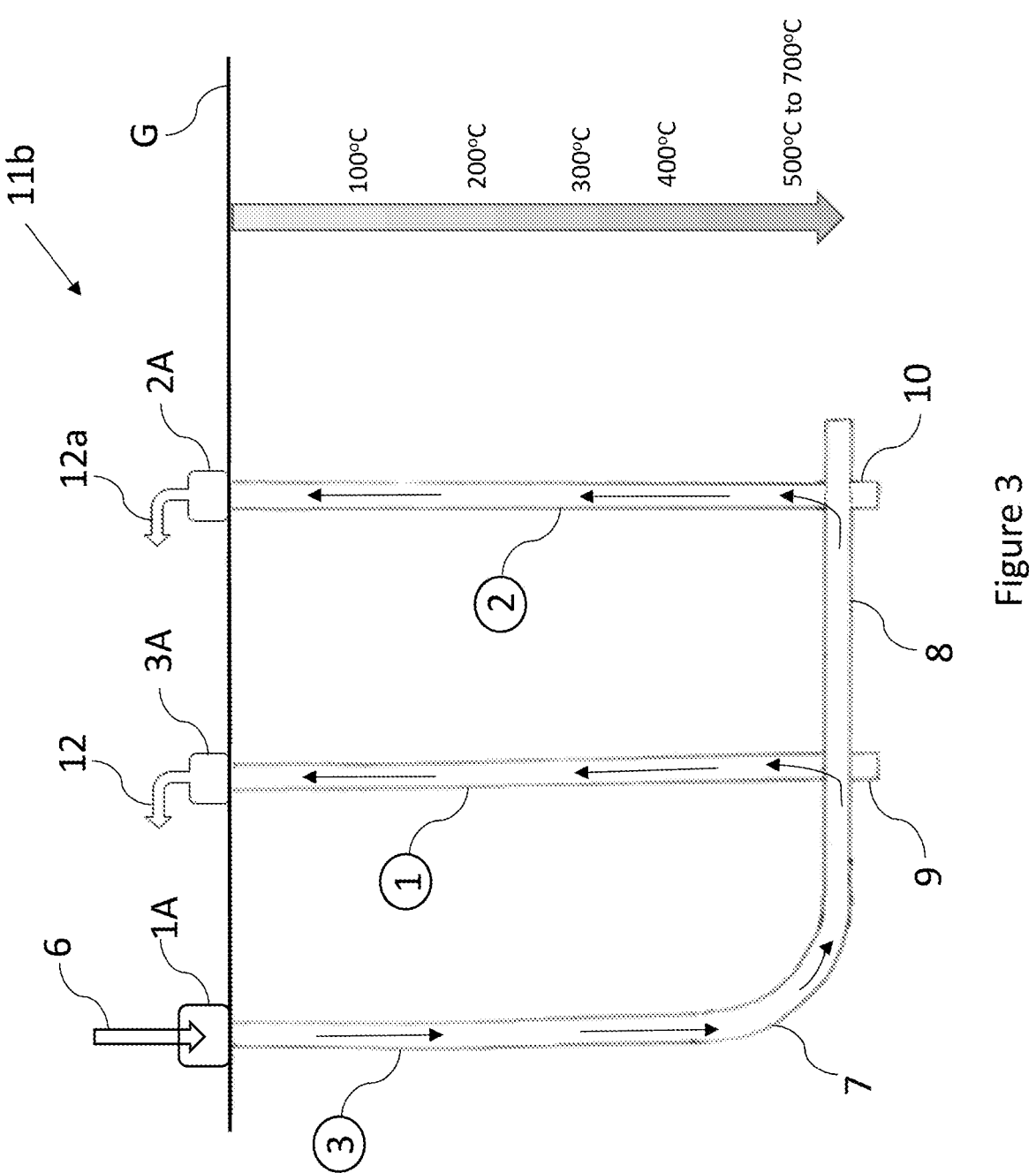
FIG. 3 is a schematic view of a multi-well geothermal syphoning system according to a third aspect of the disclosure, comprising one contoured injection well and two production wells.

Referring to the FIG. 3, a multi-well geothermal syphoning system (11b) is illustrated according to one embodiment, comprising one injection well (3) and at least two production wells (1, 2), the injection well (3) having an inlet valve for controlling a volume of a fluid medium entering the system (11b) and the at least two production wells (1, 2) each having an outlet valve for controlling the volume of the fluid medium exiting the system (11b), each of the wells (1, 2, 3) having a well bore extending downwardly from a ground surface (G) to define a plurality of substantially vertical bore sections, a first well bore comprising a first vertical bore section turning through 90 degrees and extending parallel to the ground surface to thereby define a horizontal bore section (8), the first well bore intersecting with the vertical bore sections of each of the remaining wells (1, 2) to fluidly interconnect each well (1, 2, 3) of the system (11b) such that the fluid medium at a first temperature is introduced into the at least one injection well (3) and the fluid medium at a second temperature is drawn from the at least two production wells (1, 2).

The system (11b) of FIG. 3 illustrates a first fluid inlet (6) and at least two system fluid outlets (12, 12a).

The description and features of system (11b) are understood to operate in the same manner as described above in relation to FIG. 1, notwithstanding the reversal of some flow directions of the fluid medium in the plurality of vertical bore sections.

Figure 4:
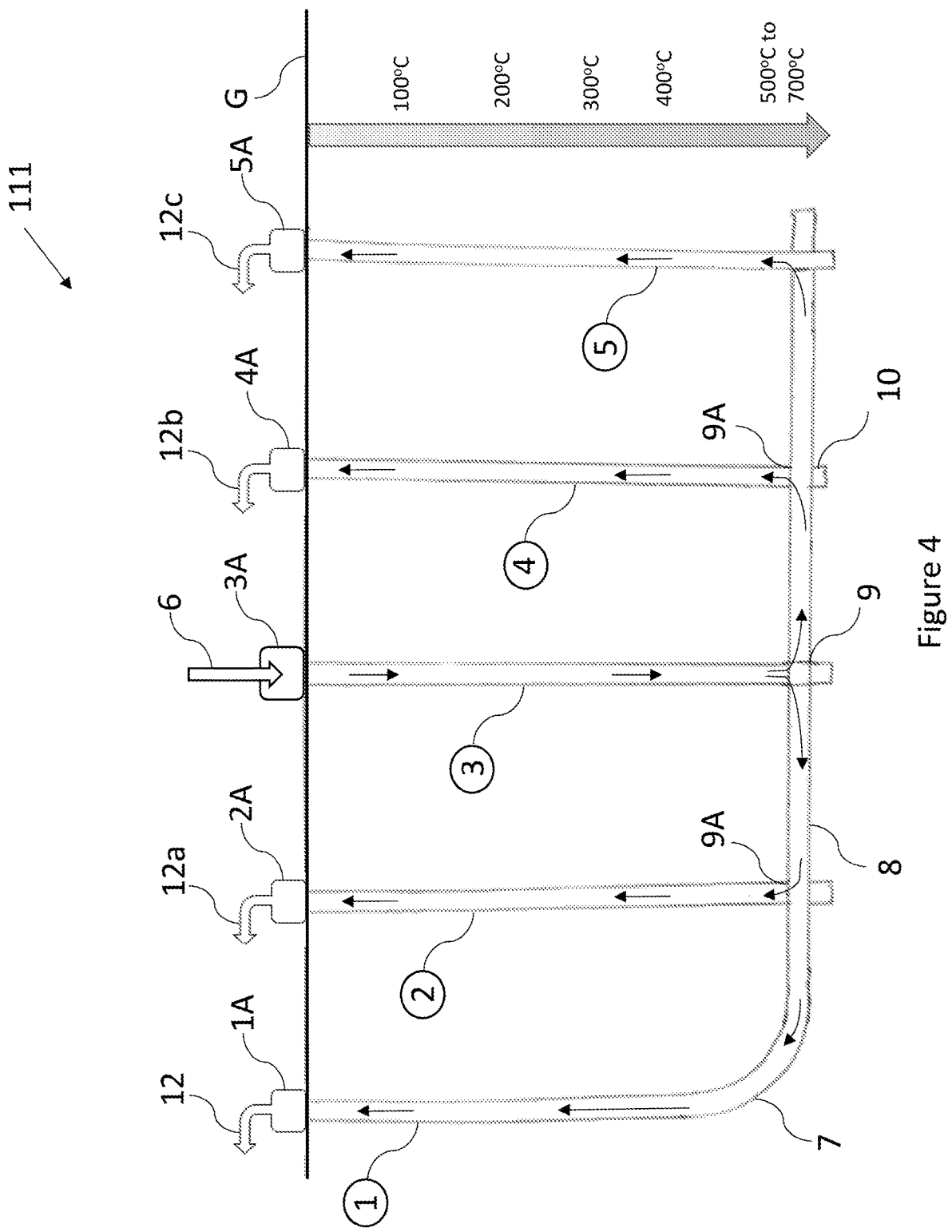
FIG. 4 is a schematic view of a multi-well geothermal syphoning system according to a fourth aspect of the disclosure, comprising one central injection well and four production wells.

Referring to the FIG. 4, a multi-well geothermal syphoning system (111) is described comprising one injection well (3) and four production wells (1, 2, 4, 5), the injection well (3) having an inlet valve for controlling a volume of a fluid medium entering the system (111) and each of the four production wells (1, 2, 4, 5) having an outlet valve for controlling the volume of the fluid medium exiting the system (111), each of the wells (1, 2, 3, 4, 5) having a well bore extending downwardly from a ground surface (G) to define a plurality of substantially vertical bore sections, a first well bore comprising a first vertical bore section turning through 90 degrees and extending parallel to the ground surface to thereby define a horizontal bore section (8), the first well bore intersecting with the vertical bore sections of each of the remaining wells (2, 3, 4, 5) to fluidly interconnect each well (1, 2, 3, 4, 5) of the system (111) such that the fluid medium at a first temperature is introduced into the injection well (3) and the fluid medium at a second temperature is drawn from the four production wells (1, 2, 4, 5).

In FIG. 4, the injection well (3) is illustrated as the central well in the system (111); however, it is contemplated that the injection well can be any well in the system. The system (111) of FIG. 4 illustrates only one injection well (3) however, it is contemplated that multiple injection wells (3) can be incorporated into the system (111).

Although not illustrated, there can be redundant wells designed into the system, such that the inlet or outlet valve sets can be adjusted to not drawn from one of the production wells of the system (111) thereby redistributing the heated fluid medium to be drawn from the remaining active production wells of the system (111).

Each well has a respective well head (1A, 2A, 3A, 4A, 5A) channelling the fluid medium into a system inlet (6) or out of one or more system outlets (12, 12a, 12b, 12c) of the system (111) via the inlet and outlet valves. These valves can be configured as inlet flow control valves and outlet flow control valves (not shown).

The plurality of wells (1, 2, 3, 4, 5) generate movement of the fluid medium along the horizontal bore section (8) of the system (111) in fluid communication with each well of the system (111) to improve transfer of thermal energy between the surrounding geology and the fluid medium within the system (111) and control a flow of the fluid medium through the system (111). The plurality of wells (1, 2, 3, 4, 5) are configured in a series of adjacent wells comprising only the single, centrally located injection well (3) for inputting fluid medium into the system (111) and outer four production wells (1, 2, 4, 5) disposed on opposing sides of the central injection well (3).

In FIG. 4, the system (111) removes the requirement for a vacuum insulated tubing (VIT casing) in each of the wells (1, 2, 3, 4, 5) which provides significant costs savings in installing and maintaining each well. Removing the VIT casing also increases the thermal energy production from each production well (1, 2, 4, 5) when compared to a well system using VIT casings and the life of the geothermal well system increases significantly when there is no VIT or in-well pumps required.

The features and advantages of system (11) as described herein apply equally to the system (111) albeit the flow volume of fluid medium within the system is slowed at the junction (9) and further slowed a second time at secondary junctions (9A).

As described above this multi well system (111) can be formed by drilling just one directional production well (1) that turns from vertical to horizontal preferably below 400° C. geology temperatures. In some embodiment, the production well (1) will not turn until it reaches a geology temperature of about 700° C. After turning the horizontal bore section (8) will continue for approximately 200 m to 600 m depending on the selected well spacing. Each of the additional wells (2, 3, 4, 5) will be vertically drilled between 50 m and 150 m apart, to intersect with the horizontal bore section (8) of the production first well (1).

Production is achieved by injecting fluid medium into the central injection well (3) at a flow rate of about 80 kg to 160 kg per second, at around 50° C. to 70° C. The flow rate will be halved at the bottom of well (3) on reaching the junction (9) such that the horizontal bore section (8) to either side of the junction (9) towards well (2) and well (4) will receive a flow rate of about 40 kg to 80 kg per second. The upward flow in wells (2) and well (4) will be at about 20 kg to 40 kg per second each. The flow of fluid medium travelling in each direction along horizontal bore section (8) will be split again on reaching secondary junctions (9A) on intersecting with the vertical bore sections of well (2) and well (4). The flow of fluid medium in the horizontal bore section (8) beyond well (2) and well (4), towards well (1) and well (5), will have a flow rate of about 20 kg to 40 kg per second, and the flow will be forced upwardly out of production well (1) and well (5) at the respective well heads (1A, 5A) at about 20 kg to 40 kg per second.

Thermal energy transfer from the geology is achieved in the upward flow of each of production wells (1, 2, 4, 5). With a relatively small amount of thermal energy being transferred to the fluid medium on the faster downward flow of injection well (3) and from the short 50 m to 150 m horizontal bore sections (8). A much larger amount of thermal energy transfer is achieved in the upward flow in each of the production wells (1, 2, 4, 5) from exposure to geology without insulated casing requirements and at a lesser flow rate.

This system (111) will see a fluid medium discharge temperature of from 250° C. to 300° C. at a flow rate of 20 kg to 40 kg per second from each production well (1, 2, 4, 5). This is calculated to have the potential to provide sufficient thermal energy to produce 5 MW to 10 MW of electricity generation from the production flow of each well (1, 2, 4, 5). As such it is calculated that the 5 well multi-well system (111) can produce from 20 MW to 40 MW of electricity for a capital expenditure in the region of AU$3 m per MW which is significantly lower than other traditional geothermal energy systems and multi-lateral geothermal energy systems that can have an installation CAPEX in excess of $200 m per MW.

It is calculated that 30 kg to 40 kg per second output flow rate to each of the production wells (1, 2, 4, 5) provides the most efficient output productivity having four production wells producing by virtue of a 100% thermal syphoning effect. Additionally, there are limitations to the maximum injection flow rate that the single injection well (3) can be subjected to. This limitation is calculated to be about 180 kg per second for a 15" diameter well.

In some embodiments it is anticipated that a portion of each vertical channel in the systems (11, 111) will have a casing, as part of the supporting structure near the ground (G). However, the casing will not extend beyond the first 2000 mm of each vertical well where granite bedrock is shallower than this level, which then improves the heat transfer to the fluid medium below this depth. Additional costs savings may be realised with no casings to install and no casings to maintain below this depth.

The heat transfer to the upper geology layers near the surface (G) also improves the efficiency of the system (11, 111) as the geology is constantly heated from the heated fluid medium travelling up the vertical bore sections of each production well (1, 2, 4, 5).

Each well (1, 2, 3, 4, 5,) extends through a series of geological layers including fresh water reservoirs, sand stone, shale, Cenozoic layer, Jurassic, lower Jurassic, Triassic layer, a Permian layer (eg. permeable layer) and a granite/bed rock layer.

In some embodiments, one or more of the wells terminate adjacent to or upon entering a substantially non-permeable granite, bed rock layer. The fresh water reservoir layer can extend, approximately 100 meters into the ground; the sand stone can extend, approximately 100 meters into (eg. below) the ground; the shale can begin at, approximately, 1500 meters into the ground; the Cenozoic layer can begin at, approximately, 3000 meters into the ground; the Jurassic layer can begin at, approximately 4000 meters into the ground; the lower Jurassic layer can begin at, approximately, 6500 meters into the ground; the Triassic layer can begin at, approximately, 7000 meters into the ground; the Permian layer (eg. permeable layer) can begin at, approximately, 7500 meters into the ground; and the granite/bed rock layer can begin at, approximately, 8800 meters into the ground. The depth of the wells (1, 2, 3, 4, 5) into the ground is dependent on the geology temperatures required from the heated fluid medium in the production wells (1, 2, 4, 5).

A computational model was created to assess the thermal harvesting potential for the system (11). The model predicts that an increased well spacing from 50 m to 100 m and even to 120 m in some cases, can improve thermal output from the system (11) as it can reduce ongoing thermal interference between the injection well (3) and production wells (1, 2). It is calculated that a similar result would be seen in a model of the 5 well system (111). This thermal interference can negatively impact the fluid production temperature, and thereby impact the power generation potential, as the injection well (3) can have a cooling effect on the heated fluid medium in the production wells (1, 2, 4, 5).

Increasing the well spacing from 50 m to 100 m could increase the power generation in the order of 6-12%, by reducing thermal interference between wells. There are also additional benefits from increasing well spacing as the circulation rate in the system (11, 111) will increase during later years of operation.

Surprisingly, it was found in computational modelling of the 3-well system (11) that over the course of running the model the production well temperatures and rates for each production well become self-balancing. This means that if each of the production wells (1, 2) are operated at the same well head pressure (WHP) and flow rate, each well will naturally tend towards producing the same production rate and fluid medium temperature, if each well has the same geometry.

Figure 5:
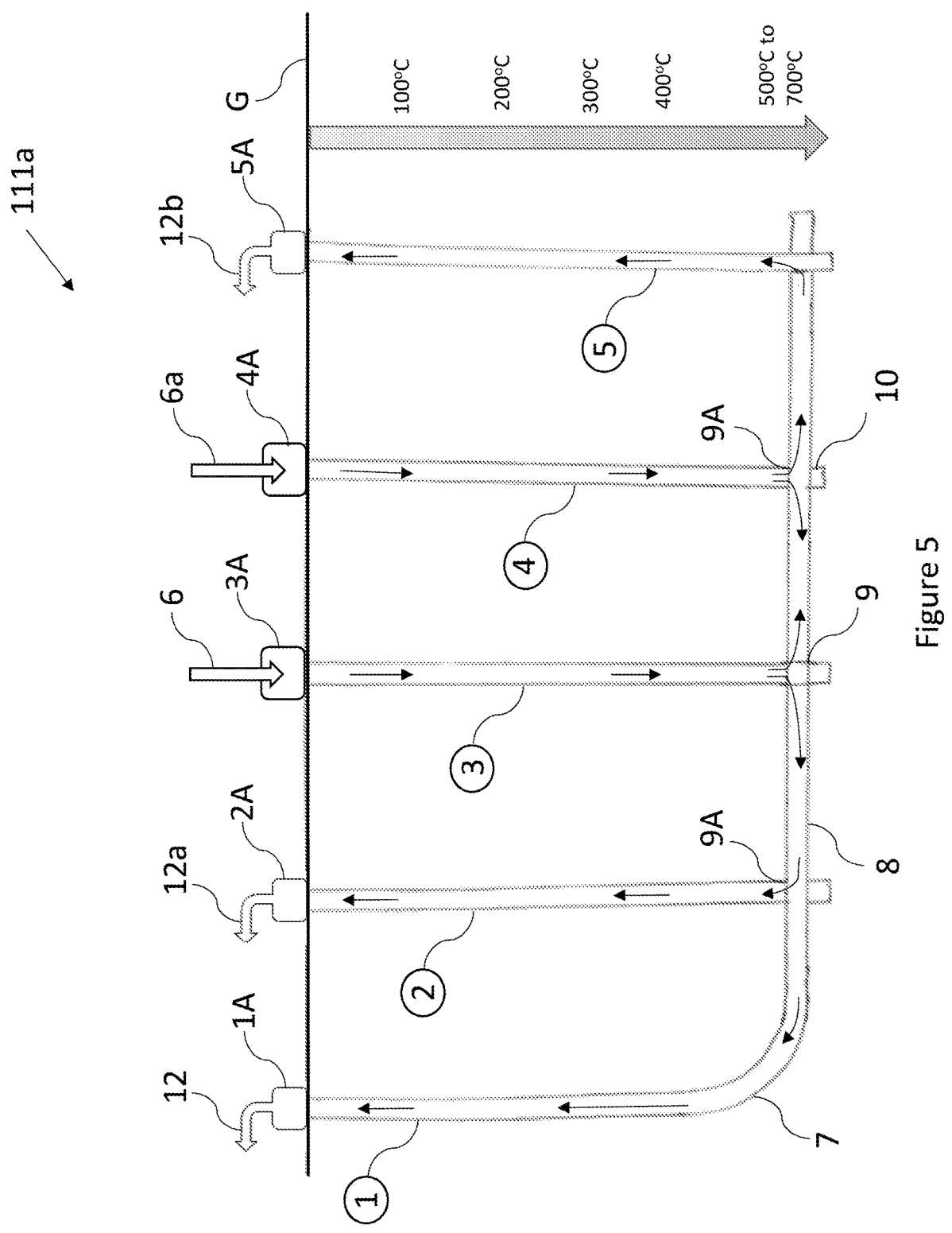
FIG. 5 is a schematic view of a multi-well geothermal syphoning system according to a fifth aspect of the disclosure, comprising two injection wells and three production wells.

Referring to the FIG. 5, a multi-well geothermal syphoning system (111a) is illustrated according to one embodiment, comprising two injection wells (3, 4) and at least three production wells (1, 2, 5), the injection wells (3, 4) each having an inlet valve for controlling a volume of a fluid medium entering the system (111a) and each of the at least

Computational Modelled Example System

A Thermal Resource Model of the three-well system illustrated in FIG. 1 was developed using an Eclipse 300 Thermal reservoir simulator to allow explicit modelling of the heat transfer between each component of the multi well thermal syphoning system (11) with time. The model accounted for the thickness and geometry of the well, presence of any casings, cement, and open-hole sections, as well as the thermal properties of each component (heat capacity and thermal conductivity). Therefore, no simplifying assumptions were required in the model to represent the heat transfer properties of the system (11) or surrounding formation. The main objective of the model was to quantify the fluid medium temperatures attainable at each production well (1, 2) and potential power generation for the system (11).

A series of scenarios were developed to evaluate and quantify the fluid medium temperatures at the production wells (1, 2) and potential power generation for 10 system (11) configurations. The two primary variables evaluated were the circulation flow rate, and the well spacing (either 50 m or 100 m). The 10 scenarios modelled are set out below in Table 1.

TABLE 1

| | | Scenarios evaluated in the computational model | |
|---|---|---|---|
| Scenario | Scenario Well Spacing (m) | Completion | System Circulation Rate (kg/sec) |
| Scenario 1 | 50 | 15" Injection Well, 12" Production Well | 20 |
| Scenario 2 | 50 | 15" Injection Well, 12" Production Well | 30 |
| Scenario 3 | 50 | 15" Injection Well, 12" Production Well | 40 |
| Scenario 4 | 50 | 15" Injection Well, 12" Production Well | 60 |
| Scenario 5 | 50 | 15" Injection Well, 12" Production Well | 120 |
| Scenario 6 | 100 | 15" Injection Well, 12" Production Well | 20 |
| Scenario 7 | 100 | 15" Injection Well, 12" Production Well | 30 |
| Scenario 8 | 100 | 15" Injection Well, 12" Production Well | 40 |
| Scenario 9 | 100 | 15" Injection Well, 12" Production Well | 60 |
| Scenario 10 | 100 | 15" Injection Well, 12" Production Well | 120 | three production wells (1, 2, 5) each having an outlet valve for controlling the volume of the fluid medium exiting the system (111a), each of the wells (1, 2, 3, 4, 5) having a well bore extending downwardly from a ground surface (G) to define a plurality of substantially vertical bore sections, a first well bore comprising a first vertical bore section turning through 90 degrees and extending parallel to the ground surface to thereby define a horizontal bore section (8), the first well bore intersecting with the vertical bore sections of each of the remaining wells (2, 3, 4, 5) to fluidly interconnect each well (1, 2, 3, 4, 5) of the system (111a) such that the fluid medium at a first temperature is introduced into the injection wells (3, 4) and the fluid medium at a second temperature is drawn from the at least three production wells (1, 2, 5).

The system (111a) of FIG. 5 illustrates a first fluid inlet (6) and a second fluid inlet (6a) and at least three system fluid outlets (12, 12a, 12b).

The description and features of system (111a) are understood to operate in the same manner as described above in relation to FIG. 4, notwithstanding the higher input volumes of fluid medium into the system via the system inlets (6, 6a) and the reversal of some flow directions of the fluid medium in the plurality of vertical bore sections.

The model was constructed from a surface to a depth of 7,300 m to enable modelling of thermal conduction along the entire well's length. The granite geological formation surrounding the system (11) was assumed to contain zero permeability, and a thermal conductivity of 3.2 W/m-K was assigned. The geology temperatures assigned to the model were set to 25° C. at the surface (G) and increased linearly to 750° C. at 6000 m, which is the consistent thermal gradient expected at the first geothermal project site to be developed by Good Water Energy.

The results of the model indicate that the three-well system can sustain geothermal power generation beyond 20 years by conductive heat mining from the geology.

For a 50 m well spacing system (11), power generation could potentially start at 7 MW-gross electricity production per well in year 1 and decline to 5 MW-gross in year 20.

The 100 m well spacing geometry produces slightly higher temperature in the fluid medium and could potentially start generation at 7.6 MW gross electricity generation per well in year 1 and decline to a sustainable 5.5 MW-gross beyond year 20.

Increasing the well spacing from 50 m to 100 m increases the power generation in the order of 6-12%, by reducing thermal interference between the wells. The thermal energy potential from the three-well system (11) is substantial and increases as the circulation rate increases.

Through the course of the study the sustained large temperature difference between the single injection well (3) and production wells (1, 2), combined with the 6000 m depth of the system (11), enables the circulation of the system (11) to be maintained by the thermosiphon effect, which negates the need for circulation pumps.

Surprisingly, it was found over the course of running the computational model that the production well temperatures and flow rates for each of the production wells (1, 2) became self-balancing.

Results at 50 m Spacing

The results indicate that the temperatures of the fluid medium at the production wells (1, 2) for all tested rates remains above 140° C. and is suitable for power generation beyond the 20 year operating period. At the lowest flow rate of 20 kg/s, fluid medium temperatures for the production wells (1, 2) remain considerably higher, at 290° C. or above for the 20 year period.

In terms of thermal energy production, the higher the circulation flow rates the greater the amount of thermal energy production, but higher than 40 kg per second flow rates from each production well resulted in the steady decline in thermal energy production beyond 20 years. After 1 year at 120 kg/s the system (11) could be producing 51 MW-thermal, before declining to 41 MW-thermal in year 20. At the other end of the analysis, the 20 kg/sec system (11) could sustain 20 MW-thermal at year 1 and well beyond the 20 year period without any perceptible decline in thermal energy production.

Using generic binary power conversion factors, the 120 kg/s circulation rate could potentially support 10 MW-gross of energy generation at the end of year one, before declining to 8.2 MW-gross in year 20 with a steady rate of decline thereafter.

With the system operating at 60 kg/s, the system can still operate at a near steady-state with very little decline beyond year 20. At 60 kg/s the modelling forecast shows the system could sustain 10.8 MW-gross electricity generation by outputting the fluid medium above 270° C. from each production well (1, 2).

Results at 100 m Spacing

The results for the 100 m spacing of the three-well system (11), for the five different circulation flow rates (20, 30, 40, 60 and 120 kg/s) are very similar to the 50 m spacing results, except production temperatures and resulting energy generation are higher due to the reduction in thermal interference between wells.

The results indicate that the fluid medium temperatures from each production well (1, 2) for all flow rates remains above 147° C. and is suitable for power generation beyond the 20 year operating period. At the lowest flow rate of 20 kg/s, fluid medium temperatures from the production wells (1, 2) remain considerably higher than 300° C. beyond the 20 year period.

In terms of thermal energy production, the higher the circulation flow rates the greater the amount of thermal energy production. After 1 year at 120 kg/s the system would be producing 52 MW-thermal, before declining to 44 MW-thermal in year 20 with further steady decline thereafter. At the other end of the analysis, the 20 kg/sec scenario could sustain 20 MW-thermal beyond the 20 period.

Using generic binary power conversion factors, 120 kg/s circulation rate could potentially support 10.5 MW-gross of energy generation at the end of year one, before declining to 8.5 MW-gross in year 20.

With the three-well system operating at 60 kg/s, the system could operate at steady-state with very little to no decline beyond year 20. At 60 kg/s the computational model indicates that the system could sustain 11.8 MW-gross generation by outputting fluid medium from the two production wells (1, 2) above 290° C. beyond 20 years.

Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colours, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g. within plus or minus five percent of a given angle or other value) are considered to be within the scope of the disclosure as recited in the appended claims. The term "approximately" when used with respect to values means plus or minus five percent of the associated value.

The terms "coupled" and the like as used herein mean the joining of two members directly or indirectly to one another. Such joining may be stationary (e.g. permanent) or moveable (e.g. removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilise the claimed disclosures to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

Without further elaboration, it is believed that one skilled in the art can use the preceding description to utilise the claimed disclosures to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

Without further elaboration, it is believed that one skilled in the art can use the preceding description to utilise the claimed disclosures to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

It is to be understood that, if any prior art publication is referred to herein, such reference does not constitute an admission that the publication forms a part of the common general knowledge in the art, in Australia or any other country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

| LEGEND | | | |
|---|---|---|---|
| Ref # | Desc. | Ref # | Desc. |
| 1 | Well bore | 1A | Production Well Head |
| 2 | Well bore | 2A | Production Well Head |
| 3 | Well bore | 3A | Injection Well Head |
| 4 | Well bore | 4A | Production Well Head |
| 5 | Well bore | 5A | Production Well Head |
| 6 | System inlet | | |
| 7 | Elbow | | |
| 8 | Horizontal section | | |
| 9 | Junction | 111 | 5 well multi-well system |
| 10 | Sump | G | Ground |
| 11 | 3 well multi-well system | | |
| 12 | System outlet | | |

The invention claimed is:

1. A multi-well geothermal syphoning system, comprising two injection wells and at least two production wells, the two injection wells each having an inlet valve for controlling a volume of a fluid medium entering the system and the at least two production wells each having an outlet valve for controlling the volume of the fluid medium exiting the system, each of the wells having a well bore extending downwardly from a ground surface to define a plurality of substantially vertical bore sections, a first well bore comprising a first vertical bore section turning through 90 degrees and extending parallel to the ground surface to thereby define a horizontal bore section, the first well bore intersecting with the vertical bore sections of each of the remaining wells to fluidly interconnect each well of the system such that the fluid medium at a first temperature is introduced into the two injection wells and the fluid medium at a second temperature is drawn from the at least two production wells, wherein each inlet valve and each outlet valve is adjustable to vary a flow volume of the fluid medium between the two injection wells and the at least two production wells to thereby control a temperature of the fluid medium at the second temperature drawn from the at least two production wells.

2. The system of claim 1, wherein the first well bore includes an elbow transitioning the direction of fluid medium flow through 90 degrees between the first vertical bore section and the horizontal bore section.

3. The system of claim 1, wherein the volume of fluid medium entering the two injection wells is substantially equal to the volume of fluid medium exiting the at least two production wells.

4. The system of claim 1, wherein the second temperature is greater than the first temperature.

5. The system of claim 1, wherein the first temperature is about 60° C.-70° C.

6. The system of claim 1, wherein the second temperature is about 250° C.-300° C.

7. The system of claim 1, wherein the volume of fluid medium entering the two injection wells is about 20 kg to 120 kg/second.

8. The system of claim 1, wherein each well is spaced about 50 metres from any adjacent well.

9. The system of claim 1, wherein each well is spaced about 100 metres from any adjacent well.

10. The system of claim 1, wherein at least one of the vertical bore sections comprises a sump for collecting and trapping particulate matter within the system.

11. The system of claim 1, wherein the vertical bore sections of each well extend downwardly from the ground surface by 5,000 metres to 12,000 metres.

12. The system of claim 1, wherein the horizontal bore section is surrounded by geology at temperatures between 400° C.-700° C.

13. The system of claim 1, wherein each inlet valve is an inlet flow control valve.

14. The system of claim 1, wherein each outlet valve is an outlet flow control valve.

15. The system of claim 1, where in the fluid medium is water or distilled water.

16. The system of claim 1, wherein the fluid medium is selected from: a gas; compressed air; carbon dioxide ($CO_2$); petroleum; and an oil medium.

* * * * *